United States Patent [19]
Otty

[11] 4,407,876
[45] Oct. 4, 1983

[54] ELECTRICAL INSULATING STITCH BONDED MATERIAL

[76] Inventor: Malcolm Otty, Westering, Mill Hay Rd., Caldy, Merseyside, England

[21] Appl. No.: 239,493

[22] Filed: Mar. 2, 1981

Related U.S. Application Data

[63] Continuation-in-part of Ser. No. 66,315, Aug. 8, 1979, abandoned.

[51] Int. Cl.³ ............................................. B05D 5/12
[52] U.S. Cl. .................................. 428/102; 427/104; 427/116
[58] Field of Search ............... 428/102, 286, 287, 288, 428/290; 427/104, 116

[56] References Cited

U.S. PATENT DOCUMENTS 3,867,245  2/1975  Herman ................................ 428/114
4,194,037  3/1980  Stoller ................................. 428/102

*Primary Examiner*—Marion McCamish
*Attorney, Agent, or Firm*—Oblon, Fisher, Spivak, McClelland & Maier

[57] ABSTRACT

This invention relates to the stitch-bonded high temperature fabric insulation of the coils of rotating electric machinery, particularly large rotating machinery such as generators and medium to large motors, and is concerned not only with such insulation during manufacture of the machinery but also with the rewinding of such machinery for repair or refurbishment.

9 Claims, 7 Drawing Figures

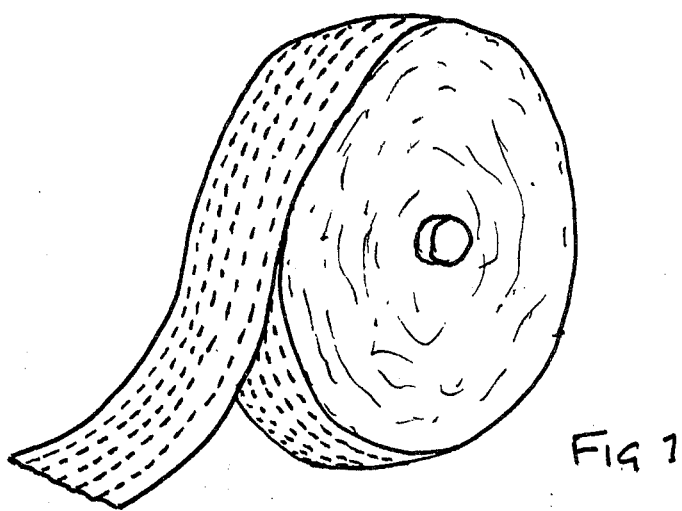
Fig 1
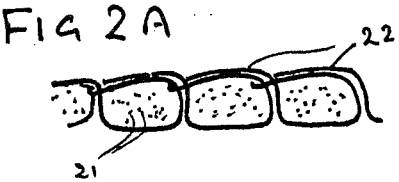
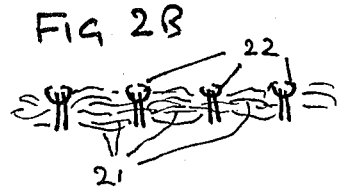
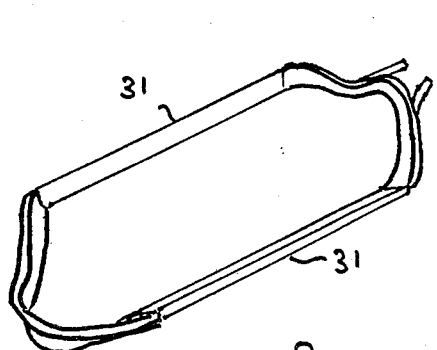
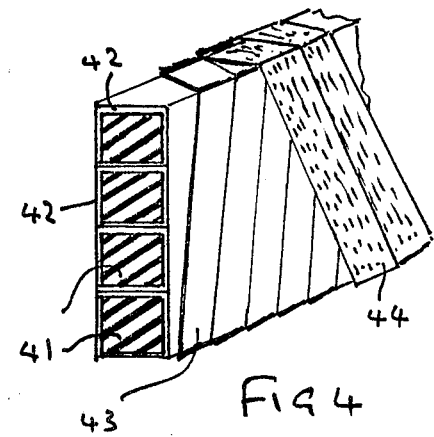

ELECTRICAL INSULATING STITCH BONDED MATERIAL

This application is a continuation-in-part of application Ser. No. 66,315 filed Aug. 8, 1979, and now abandoned.

BACKGROUND OF THE INVENTION

A coil for such machinery comprises a loop of copper (or other electrical conductor) strip or rectangular section rod or wire having perhaps four turns having a primary insulation from each other. The loop is spread so that there are two equal, parallel sections connected by an "overhang" at each end, the ends of the strip or rod coming out at one end of the coil and connected to terminals, for example, of a commutator. The two parallel sections, the cross-sections of which are usually relatively inclined, are intended to fit into slots in the rotor or stator of the machine. Their relative inclination means that the overhangs take on a somewhat complicated, kinked shape on spreading the loop.

Before insertion into the slots, the coils require further insulation, which is applied in one of a variety of ways depending upon the operating voltage. For high voltage machines, the straight, parallel sections of the coils are covered with flake mica, whereas for lower voltage machines the mica is not required. In any event, the outermost layer or layers of insulation comprise a wrapped tape material.

Conventionally, the tape is a paper tape, and, for high temperature use, the tape is often made from a high temperature synthetic fibre such as that marketed by E. I. du Pont de Nemours under the Registered Trade Mark "Nomex".

The high temperature nylon paper tape, however, has certain disadvantages in practise. For one thing, it is quite stiff and cannot be wound very satisfactorily around the corners and kinks of the coil. To improve its flexibility, it is available in crimped or corrugated form, but even this is not a complete answer. Moreover, the tape is not isotropic, and can tear quite easily in the cross direction.

It is required, also, to impregnate the insulation with resin, which is then cured, to fill any air gaps in the insulation and provide a solid and coherent coating which is at the same time capable of good heat transfer and good electrical insulating properties. The Nomex paper tape does not absorb the resin very well.

A further disadvantage of the Nomex paper tape is that it is very expensive.

SUMMARY OF THE INVENTION

The present invention provides methods of insulating the coils of electric machinery, and a material for use in such method, which constitute an improvement over the prior art, conventional methods and materials.

The invention comprises, in one aspect, a method for electrically insulating the coils of rotating electric machinery in which a fabric comprising high temperature fibres stitched together in the form of a stitch bonded fabric is applied to the machinery where the insulation thereof is required and is then impregnated with a resin which is subsequently cured so that the resin-impregnated fabric adapts to the shape of the part of the machinery to which it is applied.

The said fabric may be wrapped, in the form of a strip in which the lines of bonding stitches run lengthwise of the strip, around a coil before assembly of the coil into the machinery, the fabric being then impregnated with the resin whilst on the coil and being cured in a hot press that shapes the impregnated fabric to fit into the slots of the machinery. The fabric may be impregnated with the resin by a multistage process involving evacuating a treatment chamber in which the coil is mounted so as to eliminate air from between the fibres of the fabric and then introducing liquid resin into the chamber to fill the interstices between the fibres.

The said fabric may be wrapped, however, in the form of a strip as aforesaid around the coil overhang, after the coil has been given a primary insulation, and subsequently impregnated with a resin which is then cured. The resin may be cured after the coil has been assembled into the machinery. The resin may be applied by dipping after the coil has been assembled into the machinery.

The said fabric may, furthermore, be used in the form of a sheet to line slots in the machinery, before the insertion into the slots of the insulated coils of the machinery, and the machinery, with the coils inserted, may then be dipped in resin so as to impregnate the resin-absorbing fabric lining the slots, the resin being subsequently cured. In such application, the said fabric is preferably so arranged that the lines of bonding stitches run transversely to the length of the slot.

The invention also comprises, in another aspect, as electrical insulating material for the coils of rotating electric machinery, comprising a stitch bonded fabric comprising high temperature fibres stitched with lines of bonding stitches. The bonding stitches, too, may be of a high temperature material.

The material may be supplied in the form of a tape in which the lines of bonding stitches run lengthwise of the tape. Although narrower tapes could be used, it is preferred to have at least five lines of bonding stitches.

The invention also comprises improved rotating electric machinery comprising insulation for the coils thereof in the form of such material as above described.

There are numerous advantages from using the electrical insulating material as described. The stitch bonded fabric is particularly absorbent of resin, and, especially with the process involving evacuating the impregnation chamber, the impregnated fabric, after curing, is not prone to voids which would reduce the electrical resistance thereof. Further, in the case where the impregnated wrapping is cured in a hot press, the fabric, being relatively elastically compressible as compared with prior art paper materials, is able to conform much better to the shape of the press. Since the press mimics the shape of the slot for which the coil is intended, this assures a better fit of the insulated coil in the slot. Because of the better fit, the performance of the machine is improved. The well fitting resin impregnated wrapping of the coil is better at dissipating heat from the coil into the rotor of stator, so that the machinery can run at higher power ratings without risk of overheating.

The stitch bonded material is not expensive to produce - less so, in fact, than paper made from high temperature fibres. It is, moveover, considerably stronger than paper insulation, and, being a textile material, is very flexible. This latter property is of particular value when wrapping coil overhangs, with their curves and kinks. Paper tapes, which can only bend in one direction at a time, are unable to follow the coil contours, and gape between the turns of tape. This affords paths of lower electrical resistance through which current can leak more readily.

These and other advantages of the invention will be explained with reference to the preferred embodiments described hereinafter with reference to the accompanying drawings.

BRIEF DESCRIPTION OF THE DRAWINGS

FIG. 1 is a view of a roll of strip-form fabric in accordance with the invention, FIG. 2A is a lengthwise section through the strip of FIG. 1, FIG. 2B is a cross-section of the strip of FIG. 1, FIG. 3 is a perspective view of a coil for a large rotating machine, FIG. 4 is a perspective view of a section of such a coil as shown in FIG. 3 showing the layers of insulation applied to the conductor.

DESCRIPTION OF THE PREFERRED EMBODIMENTS

Figure 5:
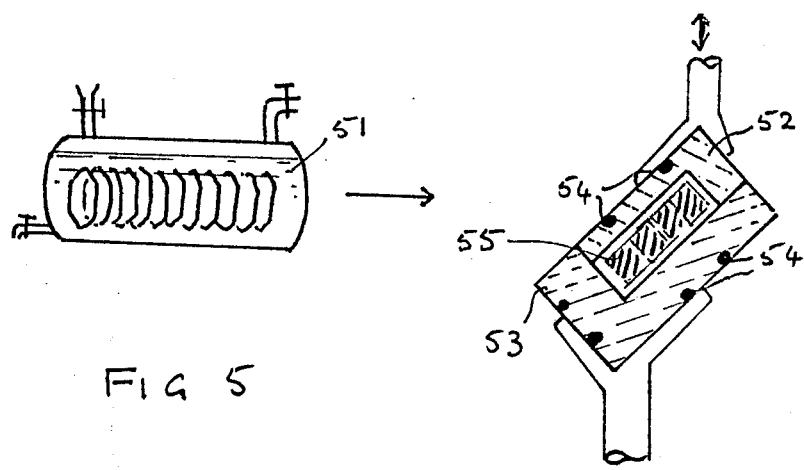
FIG. 5 is a diagrammatic illustration of a vacuum-pressure impregnation process followed by a hot coil pressing operation.

FIGS. 1, 2A and 2B illustrate the electrical insulating material of this invention. FIG. 1 shows the material supplied in strip form on a roll, although, as will later appear, it will also be useful in sheet form. The material is essentially a stitch bonded fabric, that is to say a fabric formed predominantly from fibres which are formed into a fleece as by carding and cross-folding operations, the fleece being then stitched along parallel lines with warp threads. The technique for making this type of fabric is well known, though its uses have essentially been confined to household textiles such as drapes, bedspreads, mattress covers and the like, and to certain industrial uses as a substrate for p.v.c. coatings to make tarpaulins, coated rainwear and linings for boots and interlining for clothing. In all such end uses, the fibres used are rayon or polyester or like textile fibres, and the stitching yarn is usually continuous filament polyester or nylon thread.

The structure of the fabric is shown in more detail in FIGS. 2A and 2B, in which the fibres 21 are seen to be held together by chain stitches of the stitching yarn 22.

The invention is based on the use of the properties of such a fabric in combination with the high temperature resisting properties of Nomex or other high temperature resisting textile fibres and yarns in a resin-based system for the insulation of rotating electric machines.

FIG. 3 shows a coil of a large rotating electric machine, which is the basic element that requires insulation. The coil consists of two parallel straight sections 31 that fit into slots in the rotor or stator of the machine, joined by "overhang" sections that are curved and kinked by virtue of the way the coil is spread from a basic loop.

The insulation of such coils is more or less complicated depending on the specified voltage. A high voltage assembly is shown in FIG. 4, which shows a cutaway view of one of the straight sections 31 of the coil of FIG. 3. The coil consists of four turns of square section copper wire 41. The wire 41 is precoated with an insulating varnish layer 42 and the assembly is then covered with layers 43 of flake mica. This is then wrapped with helical turns of the tape shown in FIGS. 1, 2A and 2B. Perhaps four layers of tape are applied.

At the overhang sections of the coil, the biaxial flexibility of the stitch bonded fabric is of particular benefit, since the tape can tightly wrap the coil, which is bent and kinked here, without gaping. In this regard it is superior to Nomex-based paper tapes, which are only uniaxially flexible.

In another important respect also, the stitch bonded tape is superior to paper tapes, namely, its capacity to absorb resin. After winding, the coil is impregnated with resin, preferably in a sealed pressure vessel as shown at 51 in FIG. 5 which can be evacuated to eliminate air from between the fibres of the tape and then filled with liquid resin so as to impregnate the tape therewith. After impregnation, the coil is placed in a coil press which basically comprises separable press parts 52, 53 with heating coils 54. The press parts can be separated to insert the coil 55 and then urged together hydraulically or pneumatically while the temperature is controlled through a cycle suitable to cure the resin.

As compared to the paper tape, the stitch bonded fabric tape absorbs more resin, and is not liable to have voids. Moreover, the resin, while still liquid, can flow through the stitch bonded tape under the pressure of the press so that the dimensions of the finished coil are held more precisely to the shape of the press, which is chosen so that the coil fits its intended slot more precisely. With paper tapes, the resin cannot flow, or at least not to the same extent, and this leads to inaccuracies and imperfections in the shape of the coil that reflect in the performance of the electric machine.

Figure 6:
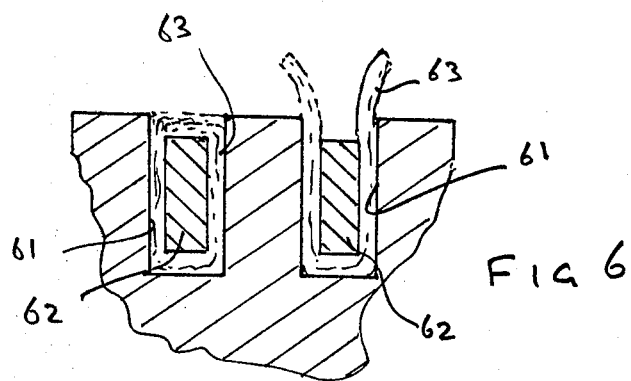
FIG. 6 is a cross-section of part of an electric machine showing the use of fabric according to the invention in sheet form as a slot liner.

FIG. 6 illustrates another use of the stitch bonded fabric, this time in sheet form, as a slot liner.

A slot 61, that is bigger than a coil 62 intended for it is lined with the fabric 63 in sheet form, the lines of stitches in this case preferably extending around the slot contour. When all the coils have been inserted, the whole assembled rotor or stator is immersed in resin so as to impregnate the fabric and the resin is then cured by heat in an oven. This not only provides a secure location of the coils but also provides a good heat conduction path so that hot spots in the coils are avoided. This enables the machine to work to a higher rating.

I claim:

1. A method for electrically insulating the coils of electrical rotating machinery in which a fabric comprising high temperature fibres stitched together in the form of a stitch bonded fabric is applied to the machinery and is then impregnated with a resin which is subsequently cured so that the resin-impregnated fabric adapts to the shape of the part of the machinery to which it is applied.

2. A method according to claim 1, in which the said fabric is wrapped, in the form of a strip in which the lines of bonding stitches run lengthwise of the strip, around a coil before assembly of the coil into the machinery, and the fabric is impregnated with the resin whilst on the coil and is then cured in a hot press that shapes the impregnated fabric to fit into the slots of the machinery.

3. A method according to claim 2, in which the fabric is impregnated with the resin by a multistage process involving evacuating a treatment chamber in which the coil is mounted so as to eliminate air from between the fibres of the fabric and then introducing liquid resin into the chamber to fill the interstices between the fibres.

4. A method according to claim 1, in which the said fabric is wrapped in the form of a strip in which the lines of bonding stitches run lengthwise of the strip, around the coil overhang, after the coil has been given a primary insulation, and is subsequently impregnated with resin which is then cured.

5. A method according to claim 4, in which the resin is cured after the coil has been assembled into the electrical machinery.

6. A method according to claim 4, in which the resin is applied, by dipping, after the coil has been assembled into the electrical machinery.

7. A method according to claim 1, in which the said fabric is used in the form of a sheet to line slots in the electrical machinery before the insertion into the slots of the insulated coils of the machinery, and the machinery, with the coils inserted, is dipped in resin so as to impregnate the said fabric lining the slots and the resin subsequently cured.

8. A method according to claim 7, in which the said fabric is so arranged that the lines of bonding stitches run transversely to the length of the slot.

9. Electric rotating machinery insulated by a method according to claim 1.

* * * * *